Figure 1:
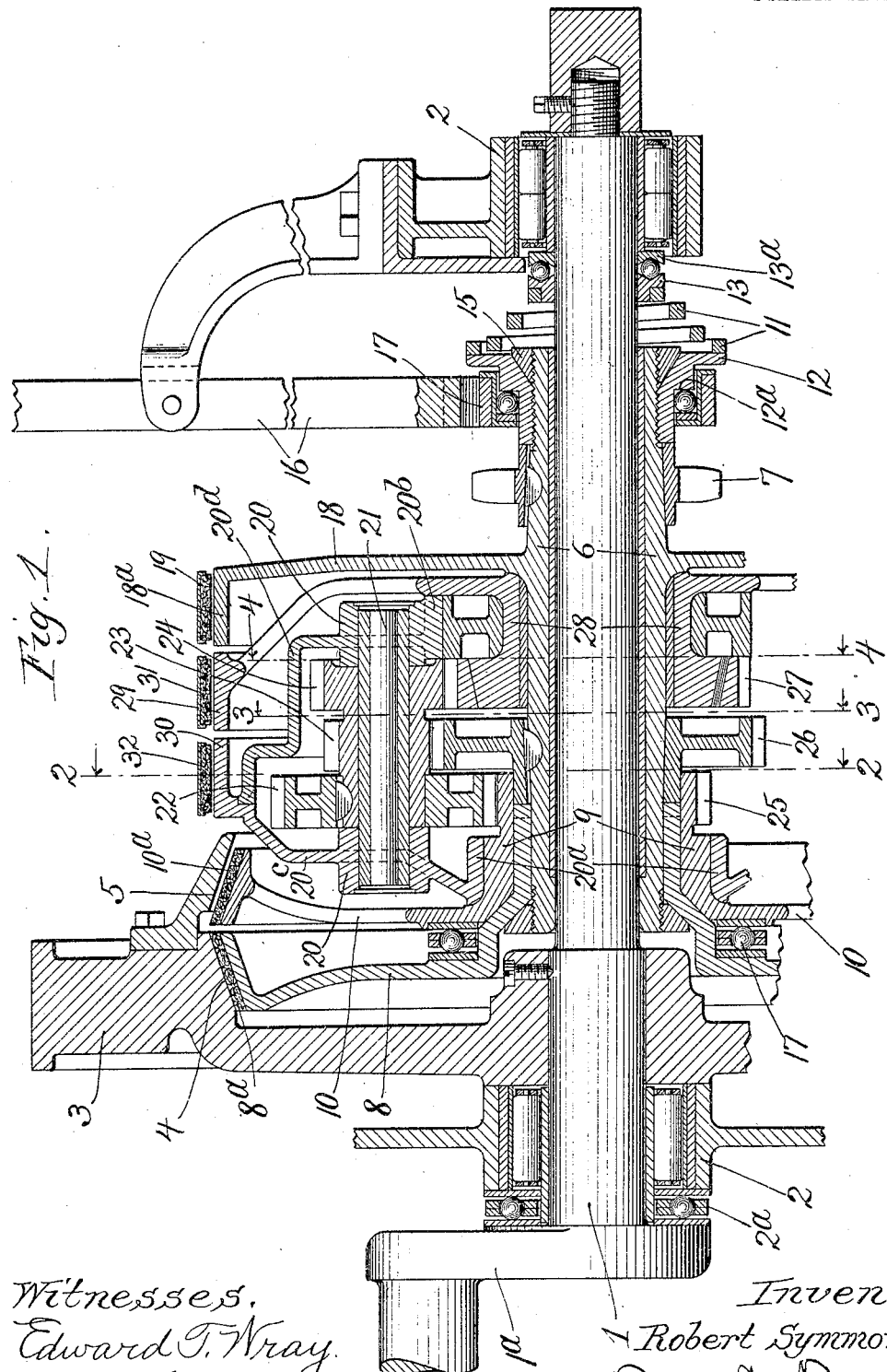

No. 794,567. PATENTED JULY 11, 1905.
R. SYMMONDS, Jr.
REVERSING AND SPEED CHANGING MECHANISM.
APPLICATION FILED MAY 25, 1904.

2 SHEETS—SHEET 1.

Witnesses.
Edward T. Wray.
Fred G. Fischer

Inventor.
Robert Symmonds, Jr.
by Burton and Burton
his Atty's

No. 794,567. PATENTED JULY 11, 1905.
R. SYMMONDS, Jr.
REVERSING AND SPEED CHANGING MECHANISM.
APPLICATION FILED MAY 26, 1904.
2 SHEETS—SHEET 2.
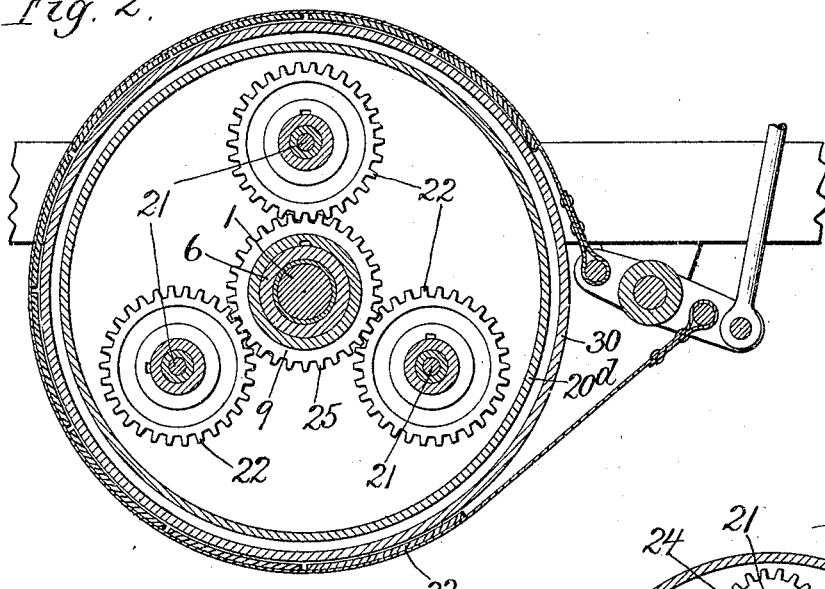
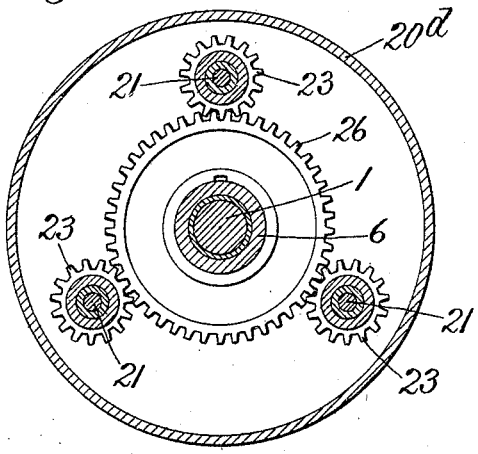
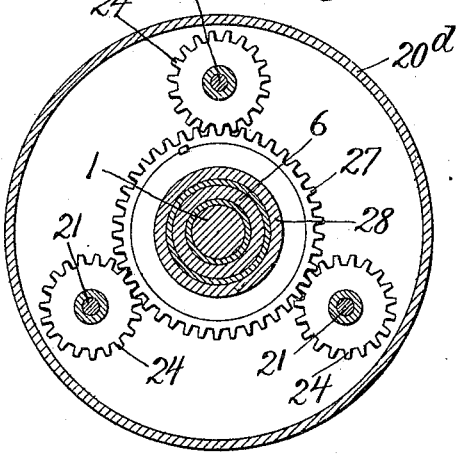
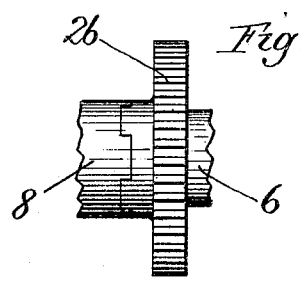
Witnesses.
Edward T. Wray.
Fred G. Fischer.
Inventor.
Robert Symmonds, Jr.
by Burton and Burton
his Atty's.

No. 794,567. Patented July 11, 1905.

UNITED STATES PATENT OFFICE.

ROBERT SYMMONDS, JR., OF KENOSHA, WISCONSIN, ASSIGNOR TO THOMAS B. JEFFERY, OF KENOSHA, WISCONSIN.

REVERSING AND SPEED-CHANGING MECHANISM.

SPECIFICATION forming part of Letters Patent No. 794,567, dated July 11, 1905.

Application filed May 25, 1904. Serial No. 209,676.

*To all whom it may concern:*

Be it known that I, ROBERT SYMMONDS, Jr., a citizen of the United States, residing at Kenosha, in the county of Kenosha and State of Wisconsin, have invented new and useful Improvements in Reversing and Speed-Changing Mechanism, of which the following is a specification, reference being had to the accompanying drawings, forming a part thereof.

The purpose of this invention is to provide an improved mechanism for transmitting the power from a motor to the axles of a motor-vehicle, with capacity for varying the speed and reversing the direction of travel.

It consists of the features of construction set out in the claims.

In the drawings, Figure 1 is a section through the power-transmitting train-axle with respect to the main or fly wheel shaft, a portion of the fly-wheel and planetary train at one side of the shaft being broken away. Fig. 2 is a section at the line 2 2 on Fig. 1. Fig. 3 is a section at the line 3 3 on Fig. 1. Fig. 4 is a section at the line 4 4 on Fig. 1. Fig. 5 is a detail view showing the mode of coupling the two parts of the planetary-gear system.

On the crank-shaft 1, which has journal-bearings in the frame, one of which is shown at 2, there is fast the fly-wheel 3, which has two inwardly-facing oppositely-inclined friction-faces 4 and 5. On the shaft 1 the sleeve 6 is mounted with capacity for sliding and rotating. Rigid with the sleeve there is a sprocket-pinion 7 for driving, by means of a chain, (not shown,) the vehicle-axle. (Not shown.) Said sleeve 6 is, in effect, the shaft of a disk wheel 8, having friction-face $8^a$ for engagement with the friction-face 4 of the fly-wheel, and outside the sleeve 6 there is sleeved thereon a shaft 9 of the disk wheel 10, having a friction-face $10^a$ for engagement with the friction-face 5 of the wheel 3. A helical spring 11 is coiled about the shaft 1 and bears at one end against the flange-collar 12, which is screwed onto the end of the sleeve-shaft 6, said spring having its other end provided with a bearing-collar 13, which forms one member of a ball-bearing of which the opposite member $13^a$ is a stop-collar made fast on the shaft 1. The spring 11 thus tends to hold the sleeve-shaft 6 and the friction-disks 8 and 10 in the position shown in Fig. 1, in which the disk 8 has its face $8^a$ in engagement with the friction-face 4 of the wheel 3. 15 is an exteriorly-tapered jam-nut screwed onto the reduced end of the sleeve 6, entering a correspondingly-tapered counterbore in the face of the collar 12 for making the same secure on said sleeve-shaft. A lever 16, operated in any convenient manner, (not shown,) has an eye 17 encompassing the hub of the collar 12 and forming one side of a ball-bearing, of which the other side is formed at the shoulder $12^a$ of the collar. The purpose of this lever is to force the sleeve against the tension of the spring 11 to withdraw the disk 8 from the friction-face 4 and carry the friction-face of the disk 10 into engagement with the face 5.

The shaft 1 is longitudinally stopped on the frame by the frame-bearing 2 between the hub of the fly-wheel 3 and the hub of the crank $1^a$, and to relieve the end thrust of the shaft in certain operations, hereinafter described, there is provided intermediate said bearings and the crank-hub the antifriction device consisting of a ball-bearing annulus $2^a$, with the balls therein exposed at opposite sides to the opposing surfaces of the bearing and hub, respectively.

The ball-bearings described between the collar 12 at one end of the spring 11 and the stop-collar 13 and those provided between the opposite side of the collar 12 and the lever 16 are desirable, because the pressure of the spring 11, furnishing the entire driving grip between the surfaces $8^a$ and 4, must exert great pressure, and since the lever 16 in compressing the spring 11 to shift the friction-disks carrying the face 10 into engagement with the face 5 must overcome the tension of this spring very objectionable friction between the lever and the collar 12 would be caused, making the ball-bearings at that point desirable, and the end thrust of the shaft due to the same tension of the springs is taken by the ball-bearings $2^a$ between the crank-hub 1ᵃ and the bearing 2. In thus shifting the disk by means of the lever 16 against the face of the spring 11 it will be seen that the pressure necessary to cause frictional engagement of the face 10ᵃ with the face 5 is transmitted from the disk 8 to the disk 10, the last-mentioned disk being directly operated by the lever 16 sliding the sleeve-shaft 6 on the shaft 1, and since, as will hereinafter appear, the two disks 8 and 10 have different speeds and sometimes opposite directions of movement when the disk 10 is engaged with the face 5 it is necessary to provide ball-bearings between these two disks where the one transmits driving pressure to the other, and such ball-bearings are shown conventionally at 17. The specific construction of the ball-bearings at each of the three positions described may be according to the judgment of the mechanic, and no specific form of such bearings is material to my invention.

Without regard to the remainder of the construction not yet described, it will be seen that when the disk 8 is engaged with the face 4, as shown in Fig. 1, the rotation of the fly-wheel 3 drives the power-communicating sprocket-wheel 7 in the same direction and with the same speed as the fly-wheel. This adjustment of the parts gives the high-speed movement for forward travel.

The sleeve 6 has rigid with it the flange-disk 18. This flange 18ᵃ is encompassed by the strap-brake 19, adapted to be operated in a familiar manner, which will be understood from the drawings without description, to apply restraining friction to the flange 18ᵃ, and thereby retard the action with the ordinary purpose of the vehicle-brake, and it will be understood that the lever 16 may be moved to a position at which it will hold the friction-faces 8ᵃ and 10ᵃ on the disks 8 and 10, respectively, intermediate between and out of engagement with both the friction-faces 4 and 5 of the wheel 3, thus disengaging the power-shaft from the vehicle-axle and rendering the application of the brake of the flange 18 effective for bringing the vehicle to rest or slackening its momentum.

For giving a regulated low speed and for reversing movement there is provided a planetary-gear train which will now be described. This train comprises the frame 20, which is journaled about the shaft 1, being directly seated at 20ᵃ on the hub or sleeve shaft 9 of the disk 10 and at 20ᵇ on the reversing-pulley 29, hereinafter described, which is itself directly journaled on the sleeve 6 inside the brake-pulley 18—that is, between the same and the fly-wheel. In this frame 20 there are journaled two or more (as illustrated, three) planetary-gear shafts 21, each of which has rigid with it three gears 22, 23, and 24. The gear 22 meshes directly with a pinion 25, which is rigid and preferably integral, as shown, with the sleeve-shaft 9 of the disk 10.

The gear 23 meshes with a gear 26 fast on the sleeve-shaft 6, and the gear 24 meshes with a gear 27, which is formed upon the hub or sleeve shaft 28 of the reversing-pulley 29, which is in turn journaled upon the sleeve 6, as above stated. The reversing-pulley 29 is of the same diameter as the brake-pulley 18. The frame 20 is formed in two parts, having, respectively, the bearings 20ᵃ and 20ᵇ mentioned for journaling the frame, as described, and these two parts are secured together by the axles 21 of the integral gears 22, 23, and 24 and are extended in the webs 20ᵈ and 20ᶜ to form a housing inclosing said gears, and said housing is further extended to form a slow-speed pulley 30 of the same diameter as the reversing-pulley and the brake-pulley. The pulleys 29 and 30 are provided with strap-brakes 31 and 32, respectively, similar to the brake 19. The gears 25 and 22 are equal in diameter, having each thirty teeth. The gears 26 and 23 have, respectively, forty-five and fifteen teeth, and the gears 27 and 24 have, respectively, forty-one and nineteen teeth. From these ratios between the intermeshing gears of the three pairs and from the mounting of the gears 25, 26, and 27 rigid, respectively, with the disk 10, disk 8, and reverse-pulley 28 the operation of the device, which will now be described, is derived.

With the motor in operation and the wheel 3 revolving, the lever 16 being moved to position at which both the disks 8 and 10 are out of engagement with the corresponding friction-faces 4 and 5 of the wheel 3, the vehicle will be at rest. For starting, the lever 16 being moved to the right, compressing the spring 11, brings the friction-face 10ᵃ of the disk 10 into operative engagement with the face 5 of the wheel 3, and thereby said disk 10, with its hub 9 and gear 25, is rotated at the speed of the fly-wheel 3; but this rotation of the disk 10 will not communicate any motion to the sprocket-wheel 7 until the brake 19 is released, nor will the release of the brake 19 cause any positive rotation of the sprocket-wheel 7 until either the planetary-gear frame or the reverse-pulley is positively held. For slow speed the brake 32 will now be clamped onto the pulley-flange 30, thereby causing the planetary gear-frame to be arrested and held. Upon this the gear 25, rotating the gear 22 at equal speed, causes all the gears 22, 23, and 24 to rotate about the axle 21 and the gear 23 to communicate to the gear 26 speed reduced to one-third that of the fly-wheel, and said gear 26 being rigid with the sleeve 6 and sprocket-wheel 7 rotates the latter at one-third the speed of the fly-wheel. In this action the gear 24, engaging the gear 27, rotates the reversing-pulley 28 and its flange 29 about the sleeve 6; but such rotation is idle—that is, it accomplishes no result. For reversing speed the brake 31 will be clamped upon the flange 29 of the reversing-pulley and the brake 32 will be released from the pulley-flange 30. The reversing-pulley 28 being now held while the planetary-gear frame is free to rotate, the result will be the planetary travel of said gear-frame and all the gears 22, 23, and 24 therein about the axis of the shaft 1 by reason of the engagement of the gear 24 with the gear 27, the latter operating as a fixed circular rack, the planetary travel being derived from the engagement of the gear 25 with the gear 22, said gear 25 having the rotary speed of the fly-wheel. The planetary movement about the axis of the shaft 1, it will be seen, will be in the reverse direction from that of the fly-wheel, but slower than the latter in the ratio of nineteen to forty-one. If the wheels 23 and 26 bore to each other the same ratio as the wheels 24 and 27, there would result from this planetary action non-rotation of the shaft 6, and if the gear 26 would be conceived of as engaged at its periphery by a point at the axis of the shaft 21 the gear 26 would be rotated about the shaft 1 and would rotate the sleeve 6 and sprocket-wheel 7 about that shaft in direction reverse to that of the fly-wheel and at the speed of the planetary-gear frame about the shaft—that is, a speed bearing to that of the fly-wheel a ratio of nineteen to forty-one. With the construction shown, therefore, it will be seen that the engagement of the gear 23 with the gear 26 will give to the latter rotation in a direction the reverse of that of the wheel 3 at a speed less than that of the planetary movement of the gear-frame by as much as the gear 23 would rotate the gear 26 if the planetary frame were at rest—that is to say, each revolution of the gear 25, giving one revolution to the gear 22, and therefore one to the gear 24, about the common axis of the two gears, will cause the planetary frame to travel over nineteen teeth of the gear 27, and in the same revolution the gear 23, rolling around the gear 26 a distance corresponding to nineteen teeth of the gear 27, will roll the gear 26 back one-third of its circumference, making its net reverse movement the difference between one-third and nineteen forty-firsts. Thus the device is adapted to give a forward speed limited only by the speed of the fly-wheel, or a slow speed forward one-third of the fast speed, or a slow speed backward the difference between said one-third and nineteen forty-firsts.

I claim—

1. In a reversing and speed-changing mechanism in combination with a power-shaft, a wheel thereon comprising the driving members of two clutches; driven members of said clutches; means for holding said driven clutch members respectively in engagement with the corresponding driving members at will; a driven shaft conaxial with the driving-shaft and a planetary-gear system having its initial wheel rigid with one of said driven clutch members and a final wheel rigid with the other driven clutch member and means for holding and releasing the planetary-gear system at will.

2. In a reversing and speed-changing mechanism in combination with a power-shaft, a wheel thereon comprising the driving members of two clutches; a driven shaft conaxial with the power-shaft; driven members of said two clutches both located at the same side of the wheel having said driving clutch members and adapted for engagement with their respective driving members by movement in opposite directions longitudinally with respect to the shaft; means for moving the driven shaft longitudinally with respect to the driving-shaft to carry said driven clutch members into and out of engagement with their driving members respectively, and a planetary-gear system having its initial wheel rigid with one of the driven clutch members and a final wheel rigid with the other, and means for holding and releasing the planetary-gear system at will.

3. In a reversing and speed-changing mechanism in combination with the power-shaft, a wheel thereon comprising the driving members of two clutches; driven members of said clutches respectively; means for holding said driven members in engagement with the corresponding driving members at will, said driven members having shafts conaxial with the power-shaft; and having the inner of their said shafts extended beyond the outer for communicating power; a planetary-gear system having its initial wheel fast on the outer of said shafts and a final wheel fast on the inner one and means for holding and releasing the planetary-gear system at will.

4. In a reversing and speed-changing mechanism in combination with the power-shaft, a wheel thereon comprising the driving members of two clutches; driven members of said clutches respectively; means for holding said driven members in engagement with their respective driving members, said driven clutch members having shafts conaxial with the power-shaft; and having one of their said shafts extended beyond the other for communicating power; a planetary-gear system mounted for rotation about the same axis, said system having its initial gear rigid with the shaft of one of said driven members and having two wheels, one of which is a final wheel loose on the shaft of the other driven clutch member and the other of which is journaled loose for rotation relatively to the power-shaft about the axis thereof, and means for holding and releasing the said last-mentioned wheel at will.

5. In a reversing and speed-changing mechanism in combination with the power-shaft, a wheel thereon comprising the driving members of two clutches; driven members of said clutches respectively adapted to be engaged with their respective driving members by movement in opposite directions longitudinally with respect to the shaft; means for moving said driven members together longitudinally with respect to the shaft for engaging either of them at will with its corresponding driving member, said driven members having their shafts sleeved one upon the other, the inner one being sleeved upon the power-shaft; and having the inner of their said shafts extended beyond the outer for communicating power; a planetary-gear system having its initial wheel fast on one of them and a final wheel fast on the other, and means for holding and releasing the planetary-gear system at will.

6. In a reversing and speed-changing mechanism in combination with the power-shaft, a wheel thereon comprising the driving members of two clutches; driven members of said two clutches located between the driving members in position for engagement by movement in opposite directions toward said driving members respectively; means for holding said driven members in engagement with either of the driving members at will, said driven members having their shafts sleeved one upon the other and the inner one sleeved upon the power-shaft; and having the inner of their said shafts extended beyond the outer for communicating power; a planetary-gear system having its initial wheel fast on the outer of the sleeved shafts, and a final wheel fast on the inner thereof, and means for holding and releasing the planetary-gear system at will.

7. In a reversing and speed-changing mechanism, in combination with a power-shaft, a wheel thereon having two friction-surfaces; two friction-wheels adapted to be frictionally engaged with said wheel friction-surfaces respectively; means for holding said friction-wheels respectively in engagement with the corresponding friction-surfaces of the wheel at will, said friction-wheels having their shafts conaxial with the wheel; and having one of their said shafts extended beyond the other for communicating power; a planetary-gear system having its initial wheel fast on one of them, and a final wheel fast on the other and means for holding and releasing the planetary-gear system at will.

8. In a reversing and speed-changing mechanism, in combination with a power-shaft, a wheel thereon having two friction-surfaces; two friction-wheels adapted to be engaged with said friction-surfaces respectively; means for holding the respective friction-wheels in engagement with the corresponding friction-surfaces of the wheel at will, said friction-wheels having their shafts conaxial with the power-shaft; and having the inner of their said shafts extended beyond the outer for communicating power; a planetary-gear system having its initial wheel fast on one of them and a final wheel fast on the other, and means for holding and releasing the planetary-gear system at will.

9. In a reversing and speed-changing mechanism, in combination with a power-shaft, a wheel thereon having two friction-surfaces; two friction-wheels adapted to be engaged with said friction-surfaces respectively; means for holding the respective friction-wheels in engagement with the corresponding friction-surfaces of the wheel at will, said friction-wheels having their shafts conaxial with the power-shaft; and having the inner of their said shafts extended beyond the outer for communicating power; a planetary-gear system having its initial wheel fast on the outer of said shafts and a final wheel fast on the inner one, and means for holding and releasing the planetary-gear system at will.

10. In a reversing and speed-changing mechanism in combination with a power-shaft, a wheel thereon having two friction-surfaces; two friction-wheels adapted to be engaged respectively with said friction-surfaces; means for holding said friction-wheels in engagement respectively with the corresponding friction-surfaces of the wheel at will, said friction-wheels having their shafts conaxial with the power-shaft; and having one of their said shafts extended beyond the other for communicating power; a planetary-gear system mounted for rotation about the same axis, said system having its initial gear fast on one of the friction-wheel shafts and having two gear-wheels deriving motion from an intermediate shaft of the system, one of which is loose on the other friction-wheel shaft and the other of which is journaled loose for rotation relatively to the power-shaft about the axis thereof, and means for holding and releasing at will the first mentioned of said two wheels.

11. In a reversing and speed-changing mechanism in combination with a power-shaft, a wheel thereon having two friction-faces; two friction-disks in position for engagement therewith by movement in opposite directions toward said faces respectively; means for holding the disks in engagement with either friction-face at will, said disks having their shafts sleeved one upon the other, the inner one being sleeved upon the power-shaft; and having one of their said shafts extended beyond the other for communicating power; a planetary-gear system having its initial wheel fast on one of them and a final wheel fast on the other, and means for holding and releasing the planetary-gear system at will.

12. In a reversing and speed-changing mechanism, in combination with a power-shaft, a wheel thereon having two friction-faces; two friction-disks between said faces in position for engagement therewith by movement in opposite directions toward said faces respectively; means for holding the disks in engagement with either friction-face at will, said disks having their shafts sleeved one upon the other, and the inner one being sleeved upon the power-shaft; and having the inner of their said shafts extended beyond the outer for communicating power; a planetary-gear system having its initial wheel fast on one of them, and a final wheel fast on the other, and means for holding and releasing the planetary-gear system at will.

13. In a reversing and speed-changing mechanism, in combination with a power-shaft, a wheel thereon having two friction-faces; two friction-disks between said faces in position for engagement therewith by movement in opposite directions toward said faces respectively; means for holding the disks in engagement with either friction-face at will, said disks having their shafts sleeved one upon the other, and the inner one being sleeved upon the power-shaft; and having the inner of their said shafts extended beyond the outer for communicating power; a planetary-gear system having its initial wheel fast on the outer of the sleeved shafts, and a final wheel fast on the inner sleeved shaft, and means for holding and releasing the planetary-gear system at will.

14. In a reversing and speed-changing mechanism, in combination with a power-shaft, a wheel thereon having two friction-faces; two friction-disks between said faces in position for engagement therewith by movement in opposite directions toward said faces respectively; means for holding said disks in engagement respectively with either of the friction-faces at will, said disks having their shafts sleeved one upon the other, the inner one being sleeved upon the power-shaft; and having one of their said shafts extended beyond the other for communicating power; a planetary-gear system mounted for rotation about the power-shaft, said system having its initial wheel fast on one of the sleeved shafts, and having two gear-wheels deriving power from an intermediate shaft of the system, one of which is loose on the other sleeved shaft, and the other of which is journaled loose about the power-shaft, and means for holding and releasing at will the first mentioned of said two wheels.

In testimony whereof I have hereunto set my hand, in the presence of two witnesses, at Kenosha, Wisconsin, this 20th day of May, 1904.

ROBERT SYMMONDS, Jr.

In presence of—
 HARRY M. VALE,
 W. H. LONSDALE.